US012531098B2

(12) United States Patent
Sethuraman et al.

(10) Patent No.: US 12,531,098 B2
(45) Date of Patent: Jan. 20, 2026

(54) MEMORY MODULE BASED DATA BUFFER COMMUNICATION BUS TRAINING

(71) Applicant: Intel Corporation, Santa Clara, CA (US)

(72) Inventors: Saravanan Sethuraman, Portland, OR (US); Tonia M. Rose, Wendell, NC (US); George Vergis, Portland, OR (US); John V. Lovelace, Driftwood, TX (US)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 17/830,118

(22) Filed: Jun. 1, 2022

(65) Prior Publication Data

US 2022/0301608 A1    Sep. 22, 2022

(51) Int. Cl.
G11C 8/18        (2006.01)
G11C 7/10        (2006.01)
G11C 7/22        (2006.01)

(52) U.S. Cl.
CPC .......... G11C 7/225 (2013.01); G11C 7/1057 (2013.01); G11C 7/1084 (2013.01); G11C 8/18 (2013.01)

(58) Field of Classification Search
CPC ..... G11C 7/225; G11C 7/1057; G11C 7/1084; G11C 8/18; G11C 29/021; G11C 29/023; G11C 29/022; G11C 29/028; G11C 29/10
See application file for complete search history.

(56) References Cited

U.S. PATENT DOCUMENTS

| | | | |
|---|---|---|---|
| 9,264,187 B1* | 2/2016 | Sosa | H04L 25/03057 |
| 10,416,912 B2 | 9/2019 | Morris et al. | |
| 10,884,958 B2 | 1/2021 | Agarwal et al. | |
| 11,061,590 B2 | 7/2021 | Morris et al. | |
| 2019/0296691 A1* | 9/2019 | Finn | H03K 5/1536 |
| 2020/0014501 A1* | 1/2020 | Kang | G01R 31/31922 |
| 2021/0279128 A1 | 9/2021 | McCall et al. | |
| 2022/0301608 A1 | 9/2022 | Sethuraman et al. | |

* cited by examiner

*Primary Examiner* — Jay W. Radke
(74) *Attorney, Agent, or Firm* — Compass IP Law PC

(57) ABSTRACT

An apparatus is described. The apparatus includes a register clock redriver (RCD) chip comprising a buffer communication (BCOM) interface, a BCOM training control circuit and BCOM training control register space, the BCOM training control circuit is to: transmit a series of symbol transmissions over the BCOM interface to a data buffer with different respective clock phase delays to sweep the symbol transmissions within an eye window; collect resultants of the symbol transmissions from the data buffer; and, perform an analysis on the resultants to determine an appropriate clock phase within the eye window.

20 Claims, 10 Drawing Sheets

MEMORY MODULE BASED DATA BUFFER COMMUNICATION BUS TRAINING

FIELD OF INVENTION

The field of invention pertains generally to the electronic arts, and, more specifically, to memory module based data buffer communication bus training.

BACKGROUND

As the role of memory in computing systems continues to expand in importance, engineers are constantly seeking ways to improve the functionality of memory devices and the ability of host systems to communicate with them, while, diminishing the overhead of such functionality and communication.

FIGURES

Figure 1A:
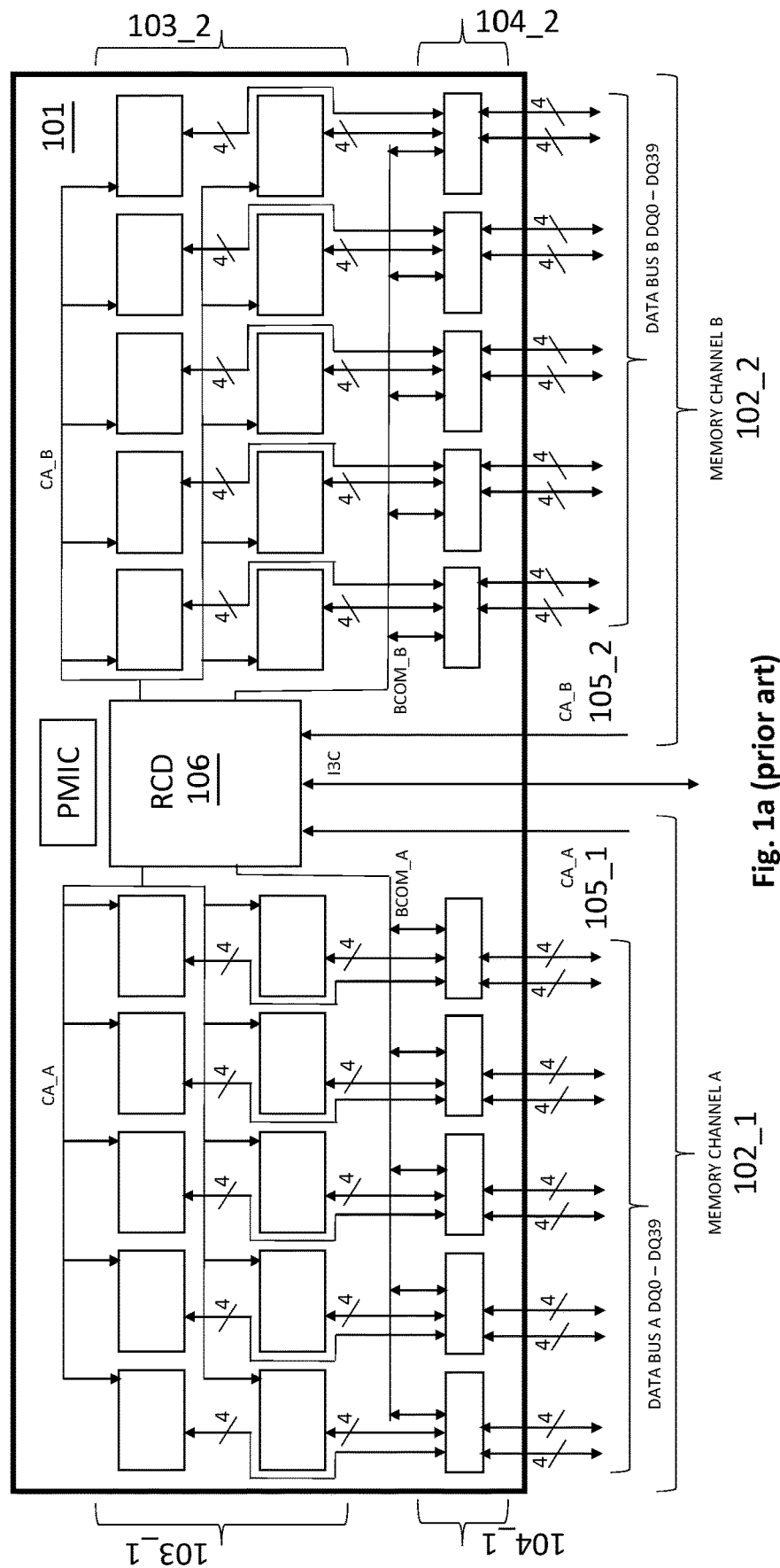
Figure 1B:
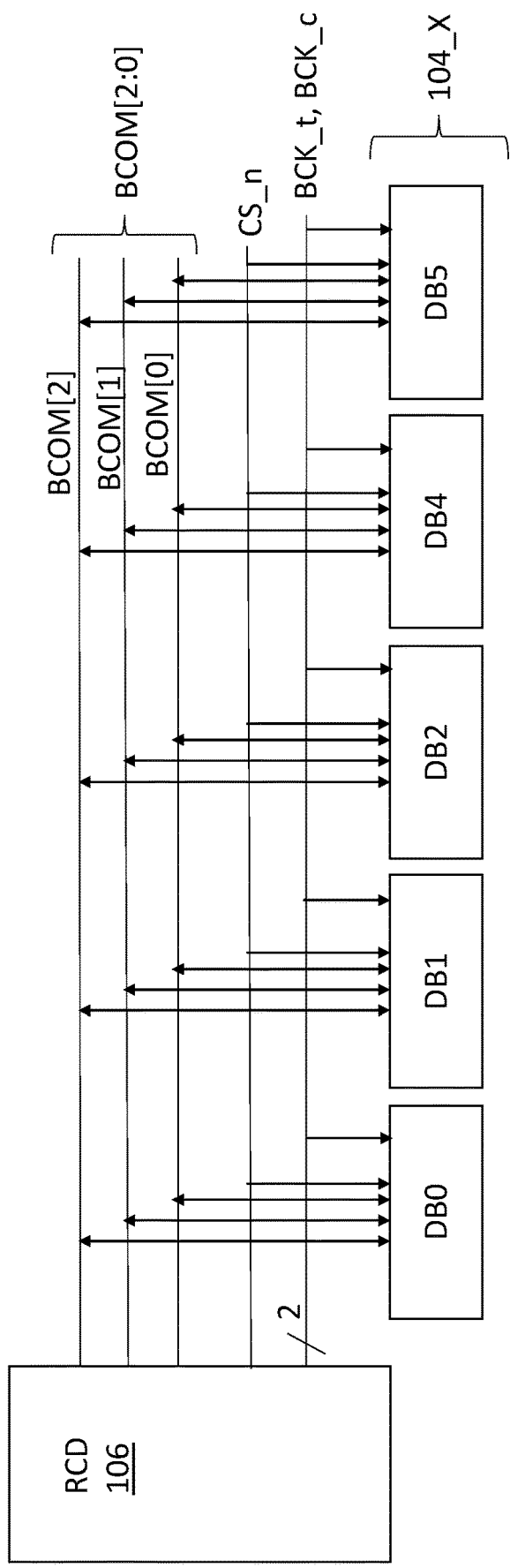
Figure 1C:
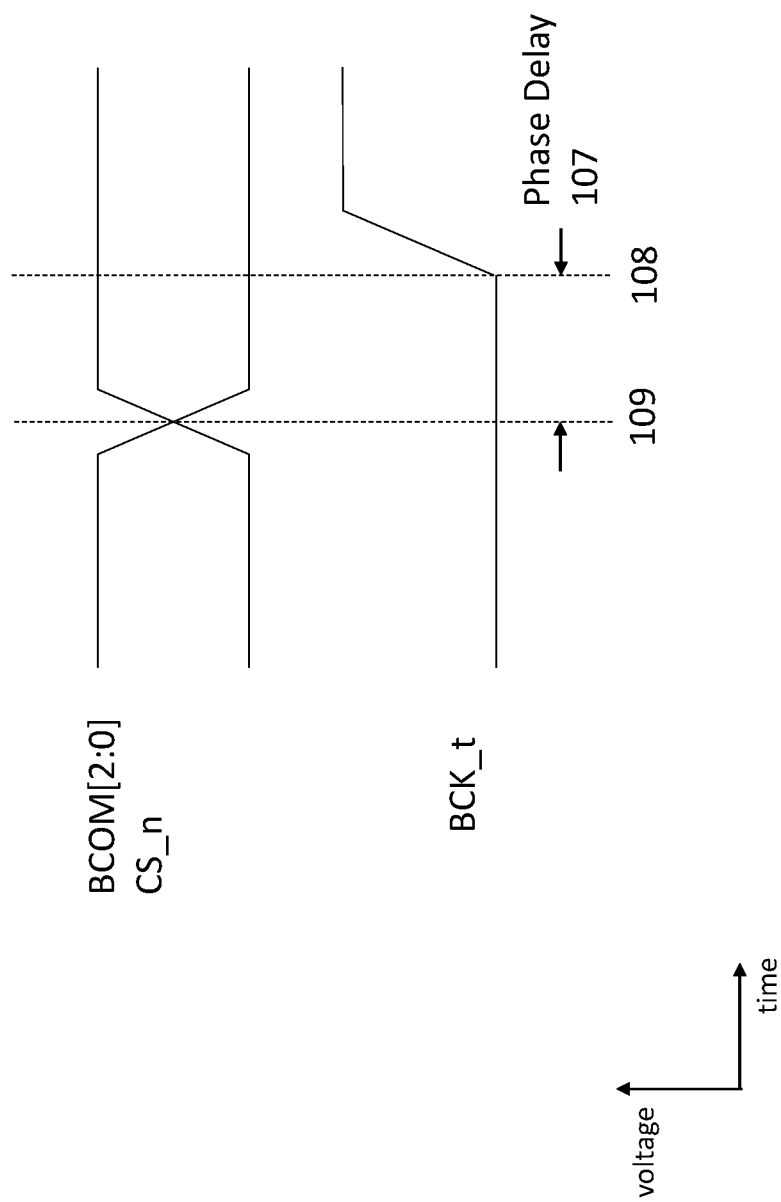
Figure 1D:
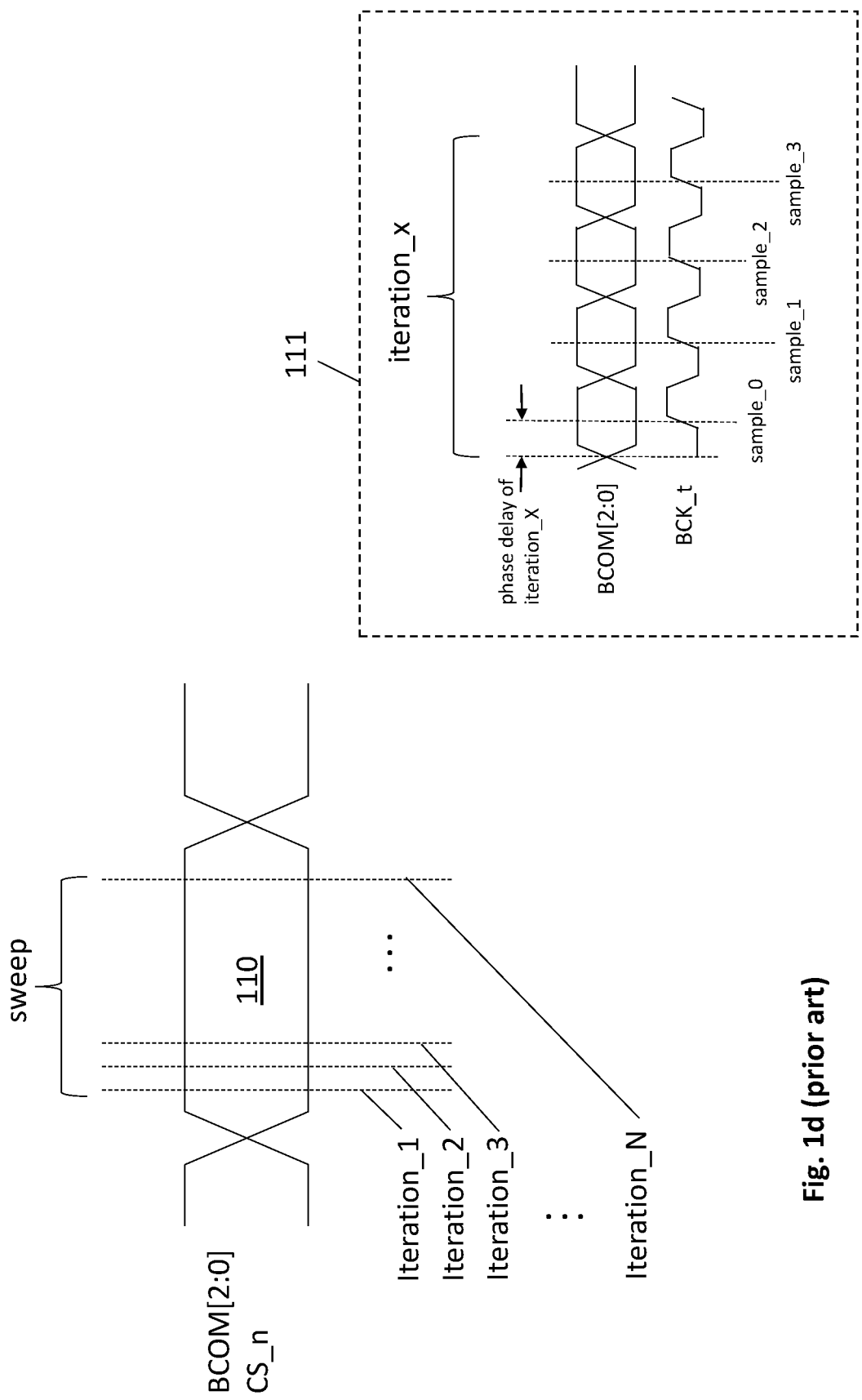
Figure 1E:
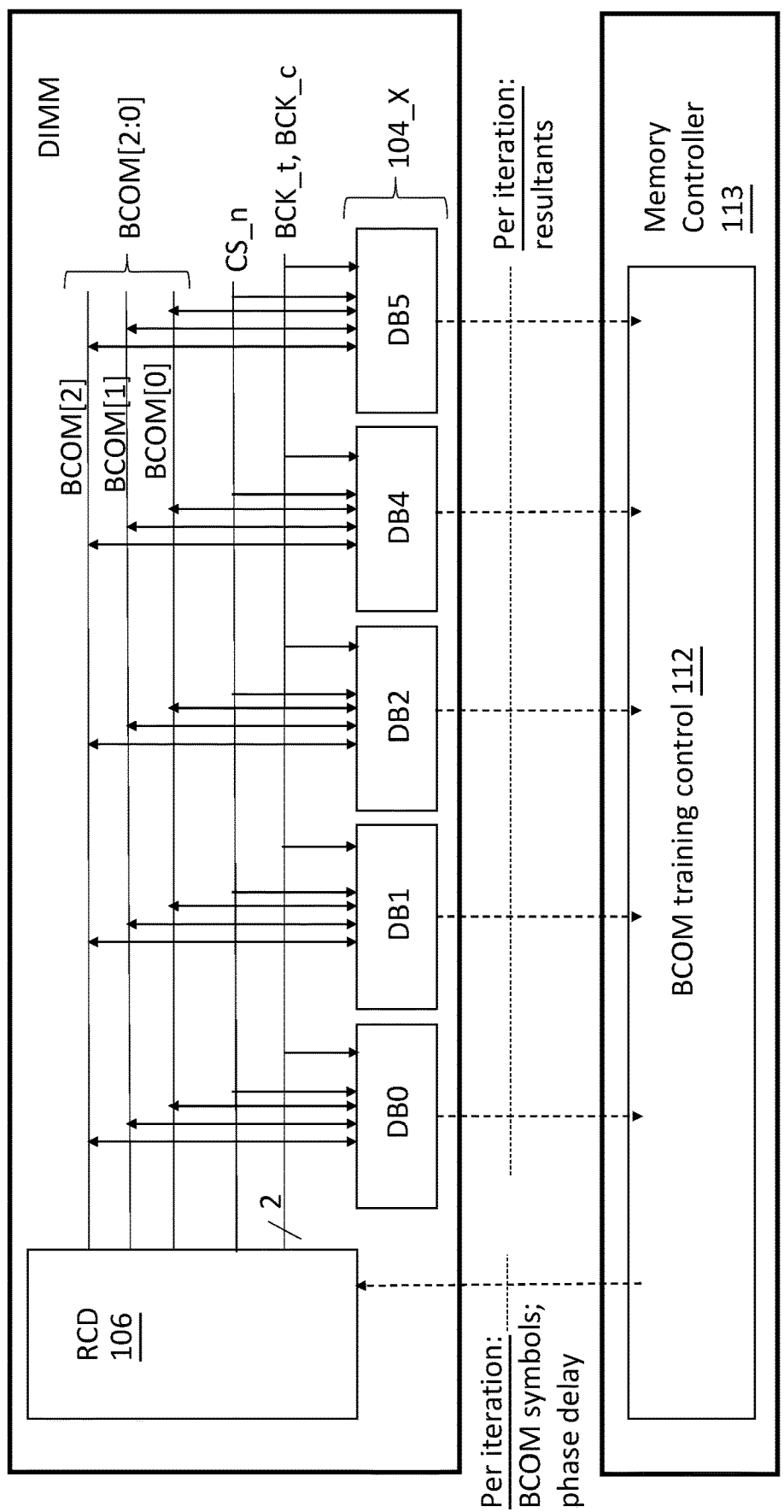
Figure 2:
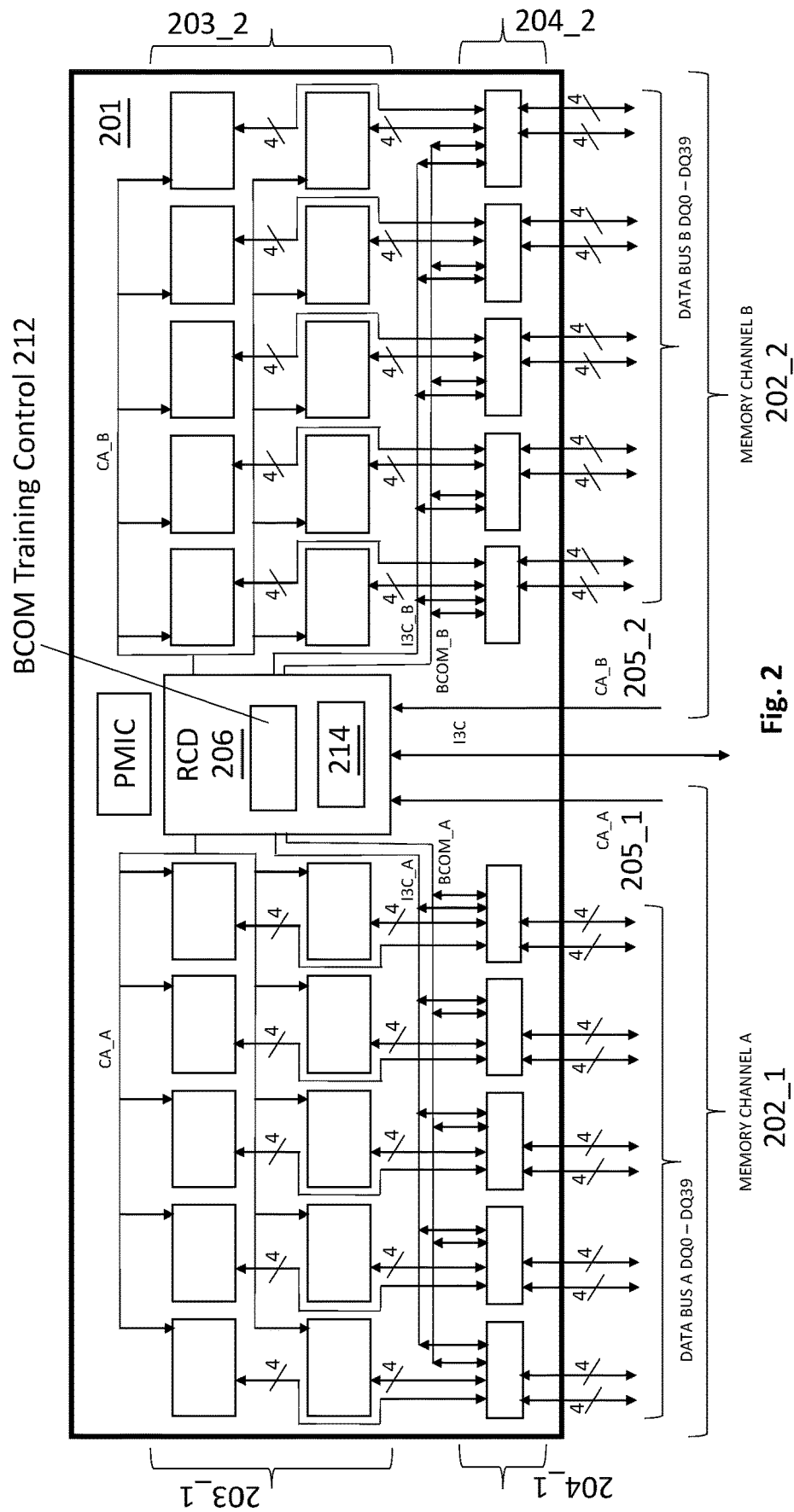
Figure 3:
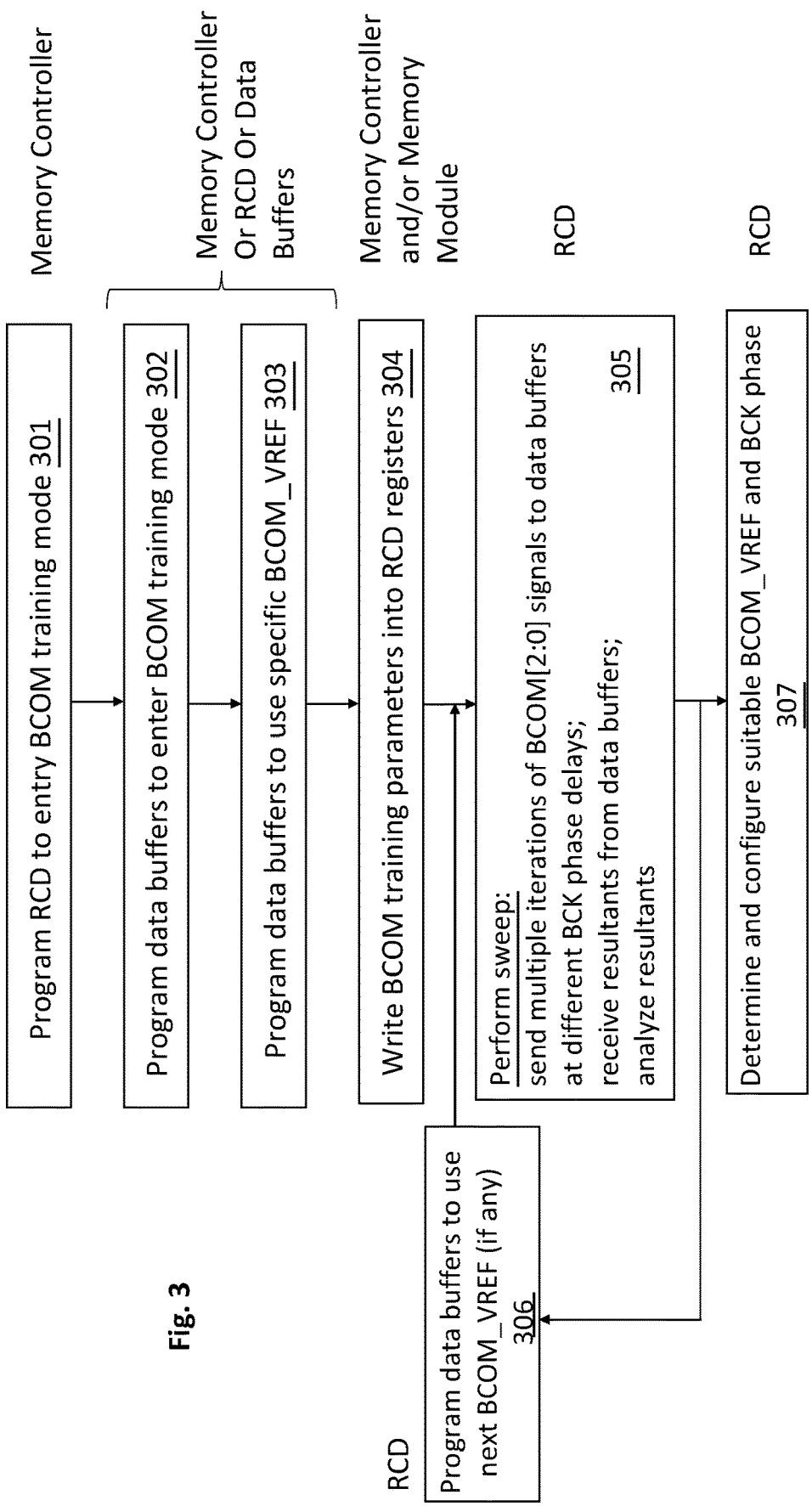
Figure 4:
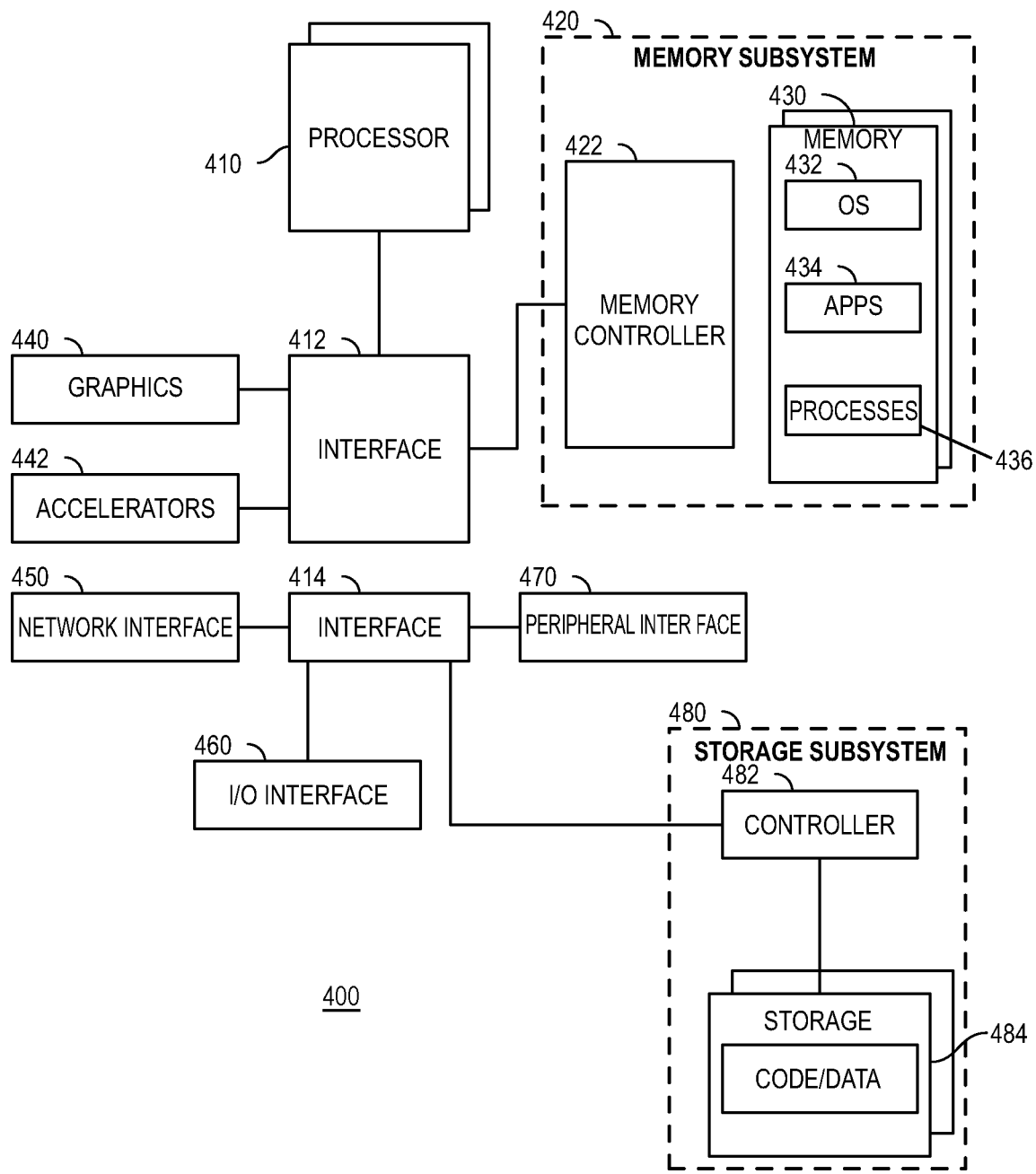
Figure 5:
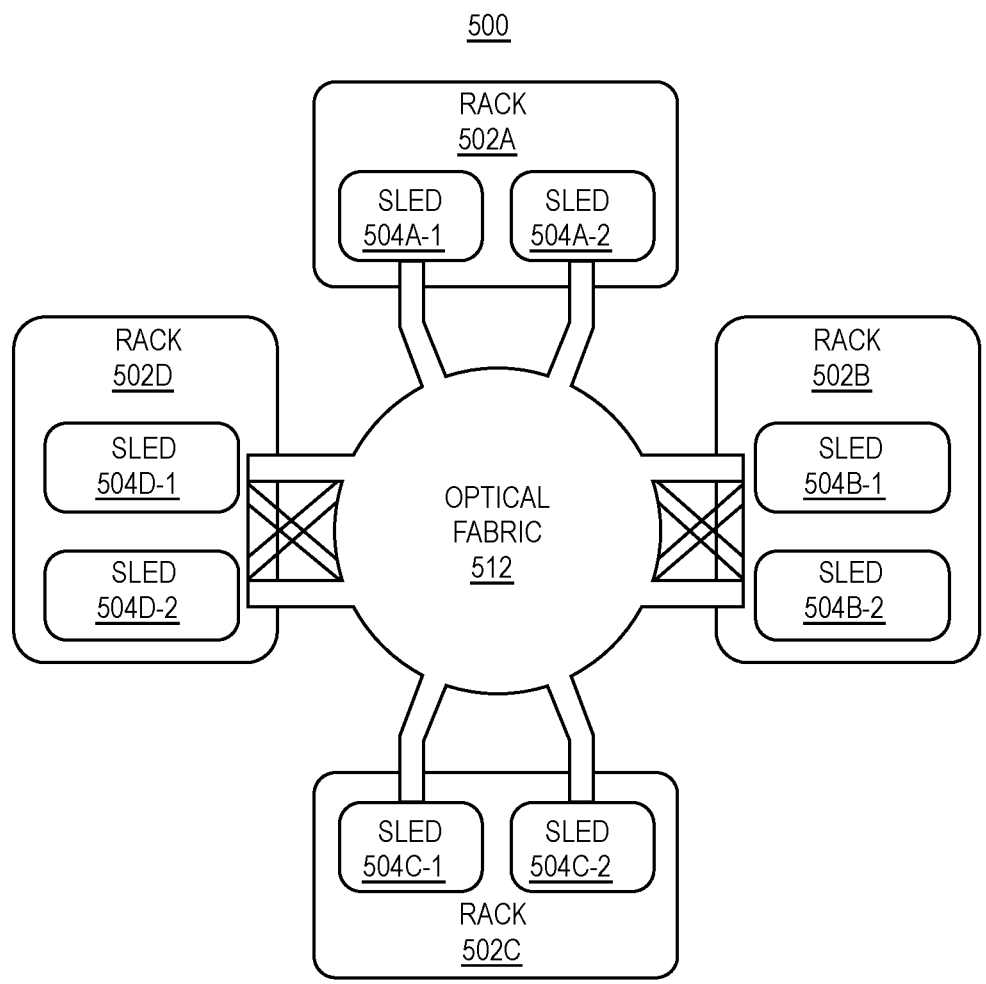
Figure 6:
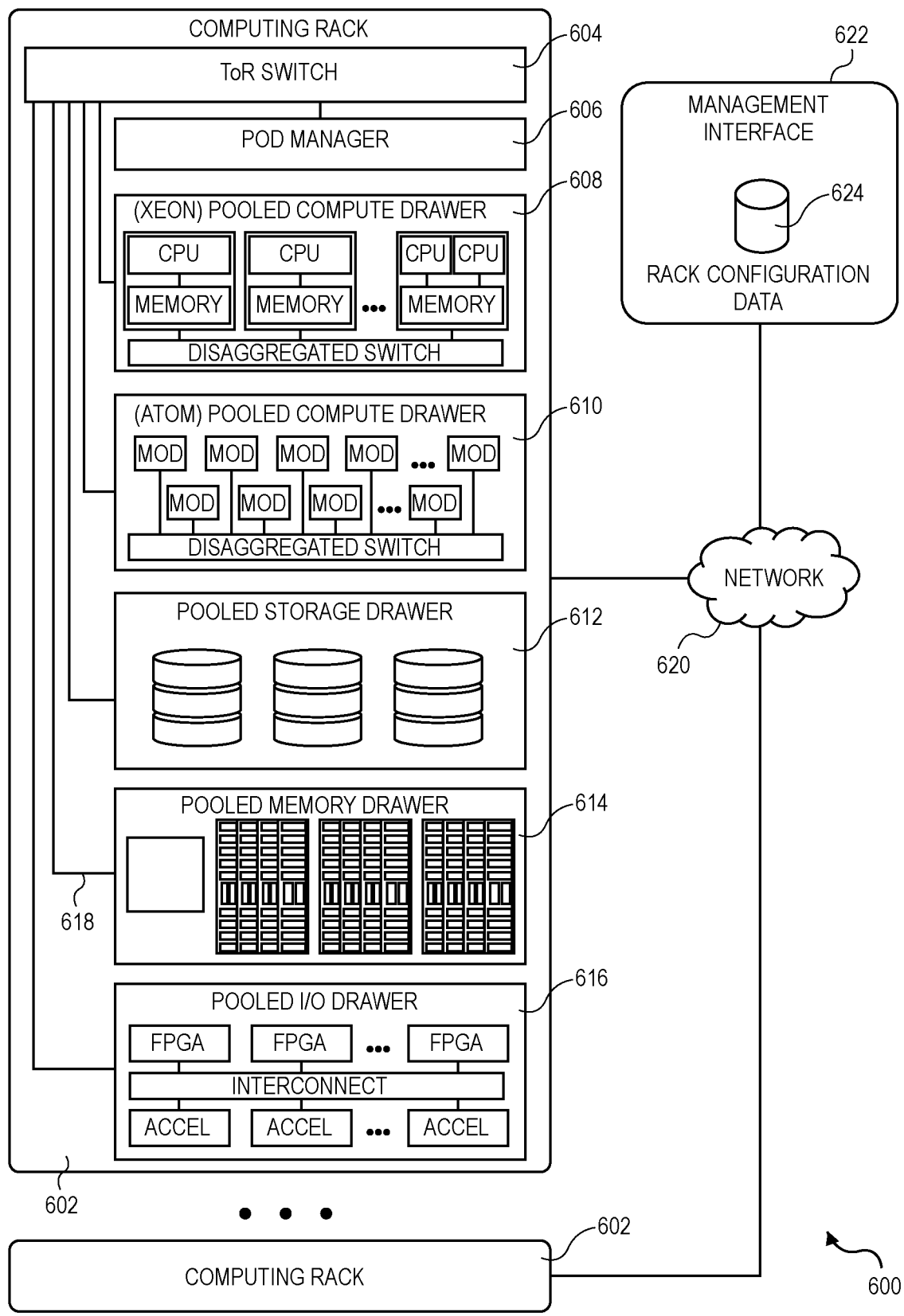

FIG. 1a depicts a DDR5 DIMM (prior art);
FIG. 1b depicts a BCOM bus (prior art);
FIG. 1c depicts symbol transmission on a BCOM bus (prior art);
FIG. 1d depicts a BCOM bus training sweep and iteration (prior art);
FIG. 1e depicts a BCOM training process (prior art);
FIG. 2 depicts an improved DIMM;
FIG. 3 depicts an improved BCOM training process;
FIG. 4 depicts a system;
FIG. 5 depicts a data center;
FIG. 6 depicts a rack.

DETAILED DESCRIPTION

FIG. 1a shows a traditional dual in-line memory module (DIMM) 101 that is, e.g., compliant with a Joint Electron Device Engineering Council (JEDEC) dual data rate (DDR) industry standard (e.g., DDR5). As observed in FIG. 1, a first memory channel 102_1 is coupled to the left hand ("A") side of the DIMM 101 and a second memory channel 102_2 is coupled to the right hand ("B") side of the DIMM 101.

A rank of memory chips 103_1 and corresponding data buffers 104_1 for the first memory channel 101_1 are therefore disposed on the A side of the DIMM 101 while another rank of memory chips 103_2 and corresponding data buffers 104_2 for the second memory channel 101_2 are disposed on the B side of the DIMM 101.

The width of the data bus for both memory channels is 40 bits where 32 bits are for customer data and 8 bits are for error correction code (ECC) information. The 40 bit width requires ten X4 memory chips 103_1, 103_2 for each memory channel 101. The ten X4 memory chips 104_1, 104_2 are arranged per channel as a first upper group of five X4 memory chips and a second lower group of five X4 memory chips.

Each memory channel 101_1, 101_2 also includes its own respective command/address (CA) bus 105_1, 105_2. The respective CA bus 105_1, 105_2 for both memory channels 101_1, 101_2 is intercepted by the DIMM's register clock driver (RCD) chip 106 (by contrast, a memory channel's data bus wires are coupled to the corresponding data buffers 104_1, 104_2 on the DIMM 101 which are then coupled to the memory channel's rank of memory chips 103_1, 103_2).

The RCD 106 receives the CA signals from the CA busses 105_1, 105_2 for both memory channels (which are generated by a host (memory controller)) and, redrives each channel's corresponding CA signals to the channel's respective memory chips 103_1, 103_2. That is, the CA signals 105_1 received for the A memory channel 101_1 are re-driven to the memory chips 103_1 and on the A side of the DIMM 101, whereas, the CA signals 105_2 received for the B memory channel 101_2 are re-driven to the memory chips 103_2 on the B side of the DIMM 101.

According to various JEDEC standards, a buffer communication (BCOM) bus exists between the RCD 106 and the data buffers 104_1, 104_2 for a particular memory channel. That is, there is one BCOM bus ("BCOM A") that couples the RCD 106 to the data buffers 104_1 of the A memory channel and another BCOM bus ("BCOM B") that couples the RCD 106 to the data buffers 104_2 of the B memory channel.

As observed in FIG. 1b, a BCOM bus includes a plurality of signal wires (e.g., three signal wires BCOM[2:0]) and a chip select (CS_n) signal wire that are coupled between the RCD 106 and each data buffer of a particular memory channel 104_X. The RCD 106 sends various commands to the data buffers 104_X on the BCOM[2:0] signal wires while activating the CS_n signal. The RCD 106 also sends a BCOM bus clock BCK_t signal and its complement signal BCK_c along with the BCOM[2:0] and CS_n signals. The data buffers 104_X latch the BCOM[2:0] signals on the rising edge of BCK_t upon the activation of the CS_n signal.

During DIMM bring-up, referring to FIG. 1c, the BCOM bus is trained to optimize the temporal delay 107 of the rising edge 108 of BCK_t beyond the edges of the BCOM [2:0] and CS_n signals 109. Here, e.g., owing to reflections caused by impedance mismatches, etc., the BCOM[2:0] and CS_n signals can exhibit substantial non-idealities near their edges 109. If the rising edge 108 of BCK_t is too close to these edges 109 the BCOM[2:0] and CS_n signals could be mis-interpreted by the receiving data buffers.

As such, referring to FIG. 1d, the training sequence includes the RCD chip repeatedly sending a sequence of BCOM[2:0] and CS_n signals to the buffer chips, where, each unique iteration of the sequence includes a different phase delay 107 between the edge 108 of BCK_t and the edges 109 of the BCOM[2:0] and CS_n signals.

According to the DDR5 standard, referring to inset 111, each iteration includes four separate transmissions of BCOM[2:0] symbols and corresponding CS_n signals. The symbols are latched by the data buffers on the rising edge of BCK_t at the specific phase delay that is set for the iteration. Thus, per iteration, the data buffers sample four different sets of BCOM[2:0] symbols. For each sample, the data buffers internally perform the logical operation (BCOM[2] XOR BCOM[1] XOR BCOM[0] XOR CS_n) and compare the result against "1010". The result of the comparison can be referred to as a resultant. Thus, per iteration, the data buffers formulate four unique resultants.

The different phase delays of the different iterations progressively advance across the BCOM[2:0] eye window 110. Thus, four unique resultants are created across a "sweep" of different phase positions over the eye window 110. An analysis is performed on the resultants for all iterations of the sweep. The phase that demonstrates the lowest error is then chosen as the correct phase relationship for the BCOM bus and is configured in the RCD for future use.

FIG. 1e shows the different system components that are involved in a DDR5 BCOM training iteration. As observed in FIG. 1e, BCOM training and control logic 112 within a memory controller 113 sends the BCOM[2:0] training symbols and BCK phase delay to the RCD 106 over the CA bus of the memory channel that the data buffers whose BCOM bus is being trained are coupled to. The RCD 106 redrives the BCOM[2:0] training symbols and corresponding CS_n signal onto the BCOM bus along with a BCK signal having the phase delay specified by the memory controller control logic 112.

The data buffers 104 then send the resultants to the memory controller control logic 112. The memory controller control logic 112 analyzes the resultants and determines an appropriate phase delay for BCK. The memory controller control logic 122 then configures the appropriate BCK phase delay into the RCD 106 which applies it going forward.

The memory controller repeatedly receives the resultants sent from the data buffers for each iteration, analyzes them, determines the appropriate BCOM[2:0] data for a next iteration (or next transmission of BCOM[2:0] within an iteration), determines the BCOM CLK phase setting for the next iteration and repeatedly communicates these determinations to the RCD who proceeds to implement them.

Notably, a full sweep of iterations can be performed for each of multiple reference voltages (BCOM_VREF) used by the data buffers to make a decision whether the BCOM[2:0] and CS_n symbols they received are a 1 or 0 when latching them. Thus, the memory controller does not make a phase delay decision until all sweeps have been performed and resultants analyzed for each of the multiple references.

A problem with this approach is the involvement of the memory controller 113 and the memory channel's data bus. Here, the sending of the iteration results over the data bus results in the data bus being largely un-useable while BCOM training is taking place, which, in turn lengthens the amount of time needed to bring-up the DIMM. Likewise, the repeated communications from the memory controller 113 to the RCD 106 consumes the memory channel's CA bus. Finally, the intelligence and control 112 of the training effort is integrated within the memory controller 113 which complicates the design of the memory controller 113 and adds to the long list of memory controller responsibilities during DIMM bring-up.

A solution, as observed in FIGS. 2 and 3, is to push more of the BCOM training intelligence and control logic out of the memory controller (not shown in FIG. 2) and into the RCD 206 and data buffers 204_1, 204_2. Here, FIG. 2 shows an improved hardware design for a DIMM 200 while FIG. 3 shows an improved BCOM training process.

Comparing FIG. 2 with FIG. 1a, note that BCOM training control circuitry 212 has been integrated into the RCD 206 with corresponding register space 214. Moreover, a respective "sideband" I3C bus (I3C_A, I3C_B) has been added between the RCD 206 and the data buffers 204_1, 204_2 for both memory channels.

I3C busses are typically used for transporting control information at modest speed and are operational shortly after power on. As such, they are ideal for communicating BCOM training information between the RCD 206 and data buffers 204_1, 204_2 before the BCOM interface is fully operational. The precise functional characteristics of an I3C bus can be found in the MIPI I3C specification v.1.1.1 promulgated by the MIPI Alliance. Other, types of control busses, whether other versions of I3C or other busses promulgated by MIPI or any other type of, e.g., low speed bus can be used as the sideband bus instead of the particular I3C bus mentioned above.

As described below with reference to FIG. 3, the memory controller initially programs high level BCOM training parameters into the RCD BCOM training related registers 214. The BCOM training control circuitry 212 then assumes command of the BCOM training sequence including the sending of BCOM[2:0] and CS_n signals with corresponding BCK phase control across multiple iterations to realize a full sweep of BCK phases across the BCOM[2:0] eye window for a particular BCOM_VREF setting. Iteration resultants determined by the data buffers 204 are sent back to the RCD 206 through the corresponding I3C bus of the BCOM bus being trained. The BCOM training control circuitry 212 then continues to perform additional sweeps for additional BCOM_VREF settings. The BCOM training control circuitry 212 analyzes the resultants of the sweeps, determines a suitable BCK phase and BCOM_VREF and then programs itself to use the BCK phase and BCOM_VREF going forward.

In various embodiments, the data buffers 204 perform the internal XOR and resultant calculation as in DDR5. However, in other extended embodiments, the data buffers include additional logic to analyze the resultants (e.g., to effectively compress the amount of resultant information that is reported back to the RCD 206) and/or internally store resultant information for one or more iterations. Importantly, resultants are sent back to the RCD over the I3C bus, rather than over the data bus of the memory channel to the memory controller. As such, other than the initial value settings that are programmed into the RCD 206, the memory controller is substantially left out of the BCOM training.

Also, in various embodiments, the BCOM training and control circuitry 212 is designed to train multiple BCOM busses in parallel or concurrently. For example, BCOM bus A can be trained while BCOM bus B is being trained. For dual sided DIMMS that have two ranks of memory chips and corresponding data buffers per memory channel (disposed on opposite sides of the DIMM), four BCOM busses can be trained by the training and control circuitry 212 in parallel/concurrently.

FIG. 3 shows a more detailed view of an embodiment of the improved process. As observed in FIG. 3, upon a point being reached in the bring-up process of the DIMM 200 where the training of a BCOM bus is appropriate, the memory controller sends 301 a multi purpose command (MPC) and/or control word via a mode register write (MRW) to the RCD 206 over the CA portion of the memory channel whose data buffers are coupled to the BCOM bus to be trained. The command and/or control word places the RCD in BCOM training mode. Here, the CA channel can be previously trained and operating at full speed, or, reduced to some (but functional) speed that is used before the CA channel is fully trained.

After the RCD 206 enters BCOM training mode, the data buffers 204 are programmed 302 to enter BCOM training mode. This can happen in various ways. According to a first approach, the memory controller programs, e.g., the RW03 register within the RCD 206 to statically set BCOM[2:0] values that the data buffers 204 are designed to interpret as a command or mode register write to enter the BCOM training mode. With static settings, the BCOM[2:0] values are quasi-DC voltages rather than AC signals which enable communication from the RCD 206 to the data buffers 204 over the BCOM bus even though the BCOM bus has not yet been trained.

In another approach, the BCOM training control circuitry 212 within the RCD 206 is designed to automatically create the static BCOM[2:0] settings without any instruction from the memory controller (the memory controller is not involved in the placing of the data buffers into BCOM training mode). In still other approaches, the RCD's BCOM training control circuitry 212 programs the data buffers 204 to enter BCOM training mode through the sideband I3C bus rather than the BCOM bus. The programming over the I3C bus can be in response to a command sent from the memory controller, or, can be done automatically by the RCD's BCOM training control circuitry 212 without memory controller involvement, e.g., as an automatic response to the RCD being placed in BCOM training mode.

After the data buffers 204 have been placed into BCOM training mode, the data buffers are configured 303 to use a particular BCOM_VREF reference voltage. As described above, BCOM_VREF is a reference voltage used by the data buffers 204 to decide whether the voltages on the BCOM [2:0] and CS_n wires correspond to a 1 or 0. The configuration 303 can take place according to any of a number of different ways. According to a first approach the data buffers are designed to internally set themselves to a default BCOM_VREF (e.g., 75% of VDD) upon power-on, reset.

According to various other approaches, the data buffers 204 are programmed to use a particular BCOM_VREF. For example, any of the above described mechanisms for programming the data buffers into BCOM training mode can be used (but with different BCOM[2:0] static settings values or I3C commands that correspond to BCOM_VREF programming rather than entry into BCOM training mode).

After the RCD 206 and data buffers 204 have been placed in BCOM training mode and the data buffers 204 have been programmed to use a particular BCOM_VREF, the memory controller writes 304 various parameters for the BCOM training into the RCD register space 214. The RCD 206 then applies these parameters when the RCD's BCOM training control circuitry 212 implements the actual BCOM training.

In various embodiments, the parameters can include: 1) a counting window or value which defines how may iterations are to be performed per sweep; 2) the BCOM[2:0] values (patterns) that are to be sent from the RCD to the data buffers per iteration; 3) a reference BCK phase delay setting from which the respective phase delays of a sweep's iterations are determined.

With respect to 1) above, as discussed above, for a particular BCOM_VREF, a sequence of test iterations are performed where each iteration is characterized by a different phase difference between the BCOM[2:0] and CS_n signals and BCK. Programming a counting window or value into the RCD allows the RCD's BCOM training control circuitry 212 to oversee and control these iterations in an ordered way. For example, with each iteration a count value is decremented by 1. When the count value reaches zero the BCOM training control circuitry 212 recognizes that the sweep has been completed (the proper number of iterations have been performed). Thus, the counting window value corresponds to how many iterations are performed per sweep.

With respect to 2) above, recall that a single iteration can entail, e.g., four consecutive BCOM[2:0] transmissions from the RCD 206 to the data buffers 204. Here, the specific symbols for transmission can be programmed into the RCD (e.g., "000", "111", "010", "101"). In various embodiments, the amount of register space in the RCD for holding the BCOM[2:0] symbols is coextensive with the total number of bits sent per iteration (e.g., twelve bits if there are four transmissions per iteration). Within a same sweep, for each iteration, the RCD BCOM training control circuitry causes the same series of symbols to be transmitted from the RCD to the data buffers.

With respect to 3) above, a sweep is carried out by performing iterations at progressively increasing BCK delays. The program entry of 3) defines, e.g., a position in the eye window from which the correct phase delay for any iteration within a sweep can be determined. For example, the position in the eye window that is programmed into the RCD can correspond to an earliest/leftmost time position in the eye window that subsequent iterations progressively advance to the right of, or, a middle position that half of the iterations are performed to the left of (approaching the middle position) and half of the iterations are performed to the right of (moving farther away from the middle position).

Although the above discussion concerning the programming of parameters 1) through 3) described an embodiment in which the memory controller programmed all of these parameters, in other embodiments some or all of these parameters are instead programmed entirely by the memory module. For example, the memory module can include non volatile memory that contains these parameters which are automatically loaded, e.g., by the RCD 206 during bring-up of the memory module, and/or, one or more of these parameters are stored on the host and are passed to the memory module through some other sideband bus that communicatively couples the RCD to the host but does not go through the memory controller. As such, in various embodiments the memory controller is also left out of the programming of one or more of the test parameters into the RCD.

With the training information being programmed into the RCD's register space 214, the RCD's BCOM training control circuitry 212 proceeds to use the information to perform the training 305. In an embodiment, complete training entails the RCD 206 performing a full sweep for multiple BCOM_VREF voltages. For each sweep at a particular BCOM_VREF, the number of iterations, the symbol information sent over the BCOM[2:0] bus for each iteration, and the respective BCK phase delay for each iteration are all determined by the RCD BCOM training control circuitry 212 from the information that was programmed 304 into the RCD's register space 214.

Thus, after the RCD BCOM training control logic 212 has processed the information in the RCD register space 214, the RCD proceeds to actually perform the training 305. This includes, as explained above, for each iteration, the RCD sending the multiple BCOM[2:0] symbols to the data buffers, and, having different BCK delays across iterations to effect a "sweep" across the eye window.

Importantly, the resultants for each iteration are sent from the data buffers 204 to the RCD 206, e.g., over the sideband I3C bus, rather than to the memory controller. As discussed at length above, this frees the memory channel data bus during BCOM training as well as lessens the responsibility and complexity of the memory controller. In various embodiments, the data buffers 204 include registers in which to store BCOM training resultants.

During BCOM training, for each iteration, the data buffers receive the BCOM[2:0] samples and latch them at the particular BCK phase delay. The data buffers store the resultants from the latched BCOM[2:0] values into their internal registers. At appropriate moments in time, these resultants are delivered to the RCD 206, e.g., over the sideband I3C bus.

The RCD 206 analyzes the resultants and, upon all resultants from all iterations for all sweeps for all BCOM_VREF voltages 306 having been received by the RCD 206, the RCD BCOM training and control logic 212 determines 307 an appropriate BCK phase delay for future use going forward and configures itself accordingly. Depending on implementation, the RCD BCOM training and control logic 212 can process the resultants as they arrive, or, accumulate all the resultants from a sweep or all sweeps and not process them then until then. In the case of the later, the RCD 206 should have enough register and/or memory space to store the resultants.

With respect to the form of the resultants as provided by the data buffers 204, in one embodiment, the data buffers calculate a resultant for each transmission of BCOM[2:0] symbols during an iteration as the result of a comparison of (BCOM[2] XOR BCOM[1] XOR BCOM[0] XOR CS_n) against the value "1010". In embodiments where there are four BCOM[2:0] transmissions per iteration, the data buffers will store four resultants per iteration.

According to one approach, sweep and iteration control as exercised by the RCD's BCOM training and control logic circuitry 212 includes receiving the resultants from a prior iteration, e.g., over the I3C bus, while BCOM[2:0] transmissions are being sent on the BCOM bus during a subsequent iteration. According to another approach, the RCD receives the resultants from an iteration before a next iteration begins. In still yet other embodiments, the data buffers 204 have enough register space to store the resultants from multiple iterations. In this case, multiple iteration resultants are periodically "dumped" to the RCD over the course of a sweep.

Regardless, the data buffers 204 should include enough register space to store all the resultant information that the data buffers could accumulate between transfers of resultant information to the RCD 206. Here, to reduce the amount of such information, the data buffers can contain additional logic that processes the resultants, e.g., from all resultants of a same iteration into a single, reduced resultant (e.g., the data buffer effectively compresses multiple resultants from a same iteration into a single resultant).

The following discussion concerning FIGS. 4, 5, and 6 are directed to systems, data centers and rack implementations, generally. FIG. 4 generally describes possible features of an electronic system that can include memory modules that can train their respective data buffers. FIG. 5 describes possible features of a data center that can include such electronic systems. FIG. 6 describes possible features of a rack having one or more such electronic systems installed into it.

FIG. 4 depicts an example system. System 400 includes processor 410, which provides processing, operation management, and execution of instructions for system 400. Processor 410 can include any type of microprocessor, central processing unit (CPU), graphics processing unit (GPU), processing core, or other processing hardware to provide processing for system 400, or a combination of processors. Processor 410 controls the overall operation of system 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Certain systems also perform networking functions (e.g., packet header processing functions such as, to name a few, next nodal hop lookup, priority/flow lookup with corresponding queue entry, etc.), as a side function, or, as a point of emphasis (e.g., a networking switch or router). Such systems can include one or more network processors to perform such networking functions (e.g., in a pipelined fashion or otherwise).

In one example, system 400 includes interface 412 coupled to processor 410, which can represent a higher speed interface or a high throughput interface for system components that needs higher bandwidth connections, such as memory subsystem 420 or graphics interface components 440, or accelerators 442. Interface 412 represents an interface circuit, which can be a standalone component or integrated onto a processor die. Where present, graphics interface 440 interfaces to graphics components for providing a visual display to a user of system 400. In one example, graphics interface 440 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 440 generates a display based on data stored in memory 430 or based on operations executed by processor 410 or both. In one example, graphics interface 440 generates a display based on data stored in memory 430 or based on operations executed by processor 410 or both.

Accelerators 442 can be a fixed function offload engine that can be accessed or used by a processor 410. For example, an accelerator among accelerators 442 can provide compression (DC) capability, cryptography services such as public key encryption (PKE), cipher, hash/authentication capabilities, decryption, or other capabilities or services. In some embodiments, in addition or alternatively, an accelerator among accelerators 442 provides field select controller capabilities as described herein. In some cases, accelerators 442 can be integrated into a CPU socket (e.g., a connector to a motherboard or circuit board that includes a CPU and provides an electrical interface with the CPU). For example, accelerators 442 can include a single or multi-core processor, graphics processing unit, logical execution unit single or multi-level cache, functional units usable to independently execute programs or threads, application specific integrated circuits (ASICs), neural network processors (NNPs), "X" processing units (XPUs), programmable control logic circuitry, and programmable processing elements such as field programmable gate arrays (FPGAs). Accelerators 442, processor cores, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), convolutional neural network, recurrent convolutional neural network, or other AI or ML model. Multiple neural networks, processor cores, or graphics processing units can be made available for use by AI or ML models.

Memory subsystem 420 represents the main memory of system 400 and provides storage for code to be executed by processor 410, or data values to be used in executing a routine. Memory subsystem 420 can include one or more memory devices 430 such as read-only memory (ROM), flash memory, volatile memory, or a combination of such devices. Memory 430 stores and hosts, among other things, operating system (OS) 432 to provide a software platform for execution of instructions in system 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software functionality to provide functions for system 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410. In some examples, a system on chip (SOC or SoC) combines into one SoC package one or more of: processors, graphics, memory, memory controller, and Input/Output (I/O) control logic circuitry.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory), JESD235, originally published by JEDEC in October 2013, LPDDR5, HBM2 (HBM version 2), or others or combinations of memory technologies, and technologies based on derivatives or extensions of such specifications.

Such memory solutions can include functionality to self train their buffer communication bus/busses as described at length above.

In various implementations, memory resources can be "pooled". For example, the memory resources of memory modules installed on multiple cards, blades, systems, etc. (e.g., that are inserted into one or more racks) are made available as additional main memory capacity to CPUs and/or servers that need and/or request it. In such implementations, the primary purpose of the cards/blades/systems is to provide such additional main memory capacity. The cards/blades/systems are reachable to the CPUs/servers that use the memory resources through some kind of network infrastructure such as CXL, CAPI, etc.

The memory resources can also be tiered (different access times are attributed to different regions of memory), disaggregated (memory is a separate (e.g., rack pluggable) unit that is accessible to separate (e.g., rack pluggable) CPU units), and/or remote (e.g., memory is accessible over a network).

While not specifically illustrated, it will be understood that system 400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect express (PCIe) bus, a HyperTransport or industry standard architecture (ISA) bus, a small computer system interface (SCSI) bus, Remote Direct Memory Access (RDMA), Internet Small Computer Systems Interface (iSCSI), NVM express (NVMe), Coherent Accelerator Interface (CXL), Coherent Accelerator Processor Interface (CAPI), Cache Coherent Interconnect for Accelerators (CCIX), Open Coherent Accelerator Processor (Open CAPI) or other specification developed by the Gen-z consortium, a universal serial bus (USB), or an Institute of Electrical and Electronics Engineers (IEEE) standard 1394 bus.

In one example, system 400 includes interface 414, which can be coupled to interface 412. In one example, interface 414 represents an interface circuit, which can include standalone components and integrated circuitry. In one example, multiple user interface components or peripheral components, or both, couple to interface 414. Network interface 450 provides system 400 the ability to communicate with remote devices (e.g., servers or other computing devices) over one or more networks. Network interface 450 can include an Ethernet adapter, wireless interconnection components, cellular network interconnection components, USB (universal serial bus), or other wired or wireless standards-based or proprietary interfaces. Network interface 450 can transmit data to a remote device, which can include sending data stored in memory. Network interface 450 can receive data from a remote device, which can include storing received data into memory. Various embodiments can be used in connection with network interface 450, processor 410, and memory subsystem 420.

In one example, system 400 includes one or more input/output (I/O) interface(s) 460. I/O interface 460 can include one or more interface components through which a user interacts with system 400 (e.g., audio, alphanumeric, tactile/touch, or other interfacing). Peripheral interface 470 can include any hardware interface not specifically mentioned above. Peripherals refer generally to devices that connect dependently to system 400. A dependent connection is one where system 400 provides the software platform or hardware platform or both on which operation executes, and with which a user interacts.

In one example, system 400 includes storage subsystem 480 to store data in a nonvolatile manner. In one example, in certain system implementations, at least certain components of storage 480 can overlap with components of memory subsystem 420. Storage subsystem 480 includes storage device(s) 484, which can be or include any conventional medium for storing large amounts of data in a nonvolatile manner, such as one or more magnetic, solid state, or optical based disks, or a combination. Storage 484 holds code or instructions and data in a persistent state (e.g., the value is retained despite interruption of power to system 400). Storage 484 can be generically considered to be a "memory," although memory 430 is typically the executing or operating memory to provide instructions to processor 410. Whereas storage 484 is nonvolatile, memory 430 can include volatile memory (e.g., the value or state of the data is indeterminate if power is interrupted to system 400). In one example, storage subsystem 480 includes controller 482 to interface with storage 484. In one example controller 482 is a physical part of interface 414 or processor 410 or can include circuits in both processor 410 and interface 414.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base, and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Such non-volatile memory devices can be placed on a memory module that can self train its buffer communication bus/busses as described at length above.

A power source (not depicted) provides power to the components of system 400. More specifically, power source typically interfaces to one or multiple power supplies in system 400 to provide power to the components of system 400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 400 can be implemented as a disaggregated computing system. For example, the system 400 can be implemented with interconnected compute sleds of processors, memories, storages, network interfaces, and other components. High speed interconnects can be used such as PCIe, Ethernet, or optical interconnects (or a combination thereof). For example, the sleds can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Although a computer is largely described by the above discussion of FIG. 4, other types of systems to which the above described invention can be applied and are also partially or wholly described by FIG. 4 are communication systems such as routers, switches, and base stations.

FIG. 5 depicts an example of a data center. Various embodiments can be used in or with the data center of FIG. 5. As shown in FIG. 5, data center 500 may include an optical fabric 512. Optical fabric 512 may generally include a combination of optical signaling media (such as optical cabling) and optical switching infrastructure via which any particular sled in data center 500 can send signals to (and receive signals from) the other sleds in data center 500. However, optical, wireless, and/or electrical signals can be transmitted using fabric 512. The signaling connectivity that optical fabric 512 provides to any given sled may include connectivity both to other sleds in a same rack and sleds in other racks.

Data center 500 includes four racks 502A to 502D and racks 502A to 502D house respective pairs of sleds 504A-1 and 504A-2, 504B-1 and 504B-2, 504C-1 and 504C-2, and 504D-1 and 504D-2. Thus, in this example, data center 500 includes a total of eight sleds. Optical fabric 512 can provide sled signaling connectivity with one or more of the seven other sleds. For example, via optical fabric 512, sled 504A-1 in rack 502A may possess signaling connectivity with sled 504A-2 in rack 502A, as well as the six other sleds 504B-1, 504B-2, 504C-1, 504C-2, 504D-1, and 504D-2 that are distributed among the other racks 502B, 502C, and 502D of data center 500. The embodiments are not limited to this example. For example, fabric 512 can provide optical and/or electrical signaling.

FIG. 6 depicts an environment 600 that includes multiple computing racks 602, each including a Top of Rack (ToR) switch 604, a pod manager 606, and a plurality of pooled system drawers. Generally, the pooled system drawers may include pooled compute drawers and pooled storage drawers to, e.g., effect a disaggregated computing system. Optionally, the pooled system drawers may also include pooled memory drawers and pooled Input/Output (I/O) drawers. In the illustrated embodiment the pooled system drawers include an INTEL® XEON® pooled computer drawer 608, and INTEL® ATOM™ pooled compute drawer 610, a pooled storage drawer 612, a pooled memory drawer 614, and a pooled I/O drawer 616. Each of the pooled system drawers is connected to ToR switch 604 via a high-speed link 618, such as a 40 Gigabit/second (Gb/s) or 100 Gb/s Ethernet link or an 100+Gb/s Silicon Photonics (SiPh) optical link. In one embodiment high-speed link 618 comprises an 600 Gb/s SiPh optical link.

Again, the drawers can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Multiple of the computing racks 600 may be interconnected via their ToR switches 604 (e.g., to a pod-level switch or data center switch), as illustrated by connections to a network 620. In some embodiments, groups of computing racks 602 are managed as separate pods via pod manager(s) 606. In one embodiment, a single pod manager is used to manage all of the racks in the pod. Alternatively, distributed pod managers may be used for pod management operations. RSD environment 600 further includes a management interface 622 that is used to manage various aspects of the RSD environment. This includes managing rack configuration, with corresponding parameters stored as rack configuration data 624.

Any of the systems, data centers or racks discussed above, apart from being integrated in a typical data center, can also be implemented in other environments such as within a bay station, or other micro-data center, e.g., at the edge of a network.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds, and other design or performance constraints, as desired for a given implementation.

Some examples may be implemented using or as an article of manufacture or at least one computer-readable medium. A computer-readable medium may include a non-transitory storage medium to store program code. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the program code implements various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled, and/or interpreted programming language.

To the extent any of the teachings above can be embodied in a semiconductor chip, a description of a circuit design of the semiconductor chip for eventual targeting toward a semiconductor manufacturing process can take the form of various formats such as a (e.g., VHDL or Verilog) register transfer level (RTL) circuit description, a gate level circuit description, a transistor level circuit description or mask description or various combinations thereof. Such circuit descriptions, sometimes referred to as "IP Cores", are commonly embodied on one or more computer readable storage media (such as one or more CD-ROMs or other type of storage technology) and provided to and/or otherwise processed by and/or for a circuit design synthesis tool and/or mask generation tool. Such circuit descriptions may also be embedded with program code to be processed by a computer that implements the circuit design synthesis tool and/or mask generation tool.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software, and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences may also be performed according to alternative embodiments. Furthermore, additional sequences may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

The invention claimed is:

1. An apparatus, comprising:
   a register clock redriver (RCD) chip comprising a) and b) below:
   a) a buffer communication (BCOM) interface; and
   b) a BCOM training control circuit and BCOM training control register space, the BCOM training control circuit to:
      transmit a series of symbol transmissions over the BCOM interface to a data buffer with different respective clock phase delays to sweep the symbol transmissions within an eye window;
      collect resultants of the symbol transmissions from the data buffer; and
      perform an analysis on the resultants to determine an appropriate clock phase within the eye window.

2. The apparatus of claim 1 wherein the RCD chip includes a sideband bus interface to receive the resultants.

3. The apparatus of claim 1 wherein the register space is to store data patterns of the symbol transmissions to be repeated across the series of symbol transmissions.

4. The apparatus of claim 3 wherein the data patterns are to be programmed into the register space by a memory controller.

5. The apparatus of claim 1 wherein the register space is to store a phase delay of the clock from which the clock phase delays are determined.

6. The apparatus of claim 5 wherein the phase delay is to be programmed into the register space by a memory controller.

7. The apparatus of claim 1 wherein the BCOM training control circuit is to transmit the series of symbol transmissions and collect resultants of the symbol transmissions for each of multiple data buffer threshold voltages.

8. A memory controller, comprising:
   circuitry to program a register clock redriver (RCD) chip with information that the RCD chip processes to perform the following without intervention by the memory controller:
   transmit a series of symbol transmissions over an interface to a data buffer with different respective clock phase delays to sweep the symbol transmissions within an eye window;
   collect resultants of the symbol transmissions from the data buffer; and
   perform an analysis on the resultants to determine an appropriate clock phase within the eye window.

9. The memory controller of claim 8 wherein the RCD chip is to be programmed over a command address (CA) bus of a memory channel that is to couple the memory controller and the RCD.

10. The memory controller of claim 8 wherein the RCD is to store data patterns of the symbol transmissions to be repeated across the series of symbol transmissions.

11. The memory controller of claim 10 wherein the data patterns are to be programmed into the RCD by the memory controller.

12. The memory controller of claim 8 wherein the RCD is to store a phase delay of the clock from which the clock phase delays are determined.

13. The memory controller of claim 12 wherein the phase delay is to be programmed into the RCD by the memory controller.

14. The memory controller of claim 8 wherein the memory controller is to further program the RCD to enter data bus interface training mode.

15. A computing system, comprising:
   a plurality of processing cores;
   a memory controller; and,
   a memory module coupled to the memory controller, the memory module comprising:
   a) a data buffer chip;
   b) a buffer communication (BCOM) bus coupled to the data buffer chip; and,
   c) a register clock redriver (RCD) chip comprising i) and ii) below:
      i) a buffer communication (BCOM) interface coupled to the BCOM bus; and
      ii) a BCOM training control circuit and BCOM training control register space, the BCOM training control circuit to:
         transmit a series of symbol transmissions over the BCOM interface to a data buffer with different respective clock phase delays to sweep the symbol transmissions within an eye window;
         collect resultants of the symbol transmissions from the data buffer; and
         perform an analysis on the resultants to determine an appropriate clock phase within the eye window.

16. The computing system of claim 15 wherein the RCD chip includes a sideband bus interface to receive the resultants.

17. The computing system of claim 15 wherein the BCOM training control register space is to store data patterns of the symbol transmissions to be repeated across the series of symbol transmissions.

18. The computing system of claim 17 wherein the data patterns are to be programmed into the BCOM training control register space by the memory controller.

19. The computing system of claim 18 wherein the BCOM training control register space is to store a phase delay of the clock from which the clock phase delays are determined.

20. The computing system of claim 19 wherein the phase delay is to be programmed into the BCOM training control register space by the memory controller.

* * * * *